(12) United States Patent
Linder et al.

(10) Patent No.: US 7,991,401 B2
(45) Date of Patent: Aug. 2, 2011

(54) APPARATUS, A METHOD, AND A SYSTEM FOR ANIMATING A VIRTUAL SCENE

(75) Inventors: Natan Linder, Motza Illit (IL); Yael Dror, Ramat-Gan (IL); Kim Michael Lee, Herzlia (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1001 days.

(21) Appl. No.: 11/889,026

(22) Filed: Aug. 8, 2007

(65) Prior Publication Data

US 2008/0039124 A1 Feb. 14, 2008

Related U.S. Application Data

(60) Provisional application No. 60/836,141, filed on Aug. 8, 2006.

(51) Int. Cl.
*H04W 88/02* (2009.01)

(52) U.S. Cl. .......................................... 455/438

(58) Field of Classification Search ............ 455/438, 455/418, 466; 379/93.24; 709/206; 717/379; 715/223, 706, 745; 345/646; 348/14.02; 382/294; 463/30, 42; 725/32
See application file for complete search history.

(56) References Cited

U.S. PATENT DOCUMENTS

| 7,023,454 | B1* | 4/2006 | Knight ........................ 345/646 |
| 7,202,886 | B2* | 4/2007 | Matsuo et al. ............. 348/14.02 |
| 7,389,002 | B1* | 6/2008 | Knight ........................ 382/294 |
| 7,396,281 | B2* | 7/2008 | Mendelsohn et al. .......... 463/42 |
| 2004/0121818 | A1 | 6/2004 | Paakkonen |
| 2004/0201666 | A1* | 10/2004 | Matsuo et al. ............. 348/14.02 |
| 2007/0101005 | A1 | 5/2007 | Shim et al. |
| 2008/0215975 | A1* | 9/2008 | Harrison et al. .............. 715/706 |

* cited by examiner

*Primary Examiner* — Diane Mizrahi (57) ABSTRACT

A method for animating a virtual scene that comprises managing a virtual scene comprising at least one virtual object, receiving a text message via a wireless communication network, identifying a pattern indicative of an animation sequence in said text message, and applying a non-facial animation on said at least one virtual object according said animation sequence.

21 Claims, 6 Drawing Sheets

APPARATUS, A METHOD, AND A SYSTEM FOR ANIMATING A VIRTUAL SCENE

RELATED APPLICATION

This application claims the benefit of U.S. Provisional Patent Application No. 60/836,141 filed Aug. 8, 2006, the contents of which are hereby incorporated by reference.

FIELD AND BACKGROUND OF THE INVENTION

The present invention relates to a method and a communication terminal for receiving and displaying electronic messages and, more particularly, but not exclusively, to a method and a mobile communication terminal for receiving and animating electronic messages.

One of the most popular communication technologies that have been developed for mobile communications systems is text messaging. Text messaging services allow communication that is based on typed text between two or more mobile users.

The most common communication system that provides such a service is cellular telephone networks providing the short message service (SMS). The SMS allows mobile users to receive text messages via wireless communication devices, including SMS-capable cellular mobile phones. Mobile and stationary users may send an electronic message by entering text and a destination address of a recipient user who is either a mobile or a non-mobile user.

Another example for such a communication service is a mobile instant messaging (MIM) service. The MIM service allows real-time communication that is based on typed text between two or more mobile users. The text is conveyed via one or more cellular networks.

Generally, an emoticon is represented in a text format by combining the characters of a keyboard or keypad. Recent developments have been designed with the ability to allow the inclusion of icons indicative of emotions, which may referred to as emoticons, into the text. Such emoticons may include a smiling figure, a frowning figure, a laughing figure or a crying figure, a figure with outstretched arms and other figures expressing various feelings. A graphic emoticon is transmitted to a mobile communication terminal by first selecting one of the graphic emoticons, which are stored in a user's mobile communication terminal as image data. Subsequently, the selected graphic emoticon is transmitted to another mobile communication terminal using a wireless data service.

For example, U.S. Patent Application No. 2007/0101005, published May 3, 2007 discloses an apparatus and method for transmitting emoticons in mobile communication terminals. The apparatus and the method include receiving a transmission request message in a first mobile communication terminal, the transmission request message related to a first graphic emoticon and including identification information for the first graphic emoticon, identifying a second graphic emoticon according to the transmission request message, and transmitting the second graphic emoticon to a second mobile communication terminal, wherein the second graphic emoticon comprises image data in a format encodable by the second mobile communication terminal.

In addition, during the last years, standards have been introduced for services including multimedia message services (MMSS) and enhanced message services (EMSs), which are standards for a telephony messaging systems that allow sending messages with multimedia objects, such as images, audio, video, rich text etc., have become very common. The MMS and EMS allow the message sender to send an entertaining message that includes an image or a video that visually expresses his or her feelings or thoughts and visually presents a certain subject matter.

A number of developments have been designed to provide services using the MMS and EMS standards. For example, U.S. Patent Application No. 2004/0121818, published Jun. 24, 2004 discloses a system, an apparatus and a method for providing MMS ringing images on mobile calls. In one embodiment, a ringing image comprises a combination of sound and images/video with optional textual information and a presentation format. The method includes receiving an incoming call from an originating mobile station; receiving an MMS message associated with the incoming call that contains ringing image data including image data and ring tone data, presenting the ringing image data to a user of the terminating mobile station, and in response to presentation of the ringing image data, receiving an indication from the user to answer the incoming call.

SUMMARY OF THE INVENTION

Some of the present embodiments comprise an apparatus and a method that allows users to communicate through animated scenes with one or more virtual objects. The apparatus and the method display to a user of a mobile communication terminal a scene that has been animated according to a set of instructions. The set of instruction is based on one or more patterns and/or tags indicative of emotions and/or objectives which are included in an electronic message, such as an SMS. Optionally, the animated scene receiving an electronic message with one or more tags representing emotions and/or objectives expresses a thought, intimation, an announcement, a notice and/or an idea of the sender, such as a subscriber of a wireless network, in a form suitable for transmission in the electronic message. The electronic message is transmitted over a wireless communication network, such as a cellular network, in an electronic message, such as an SMS.

According to one embodiment of the present invention there is provided a mobile communication terminal, such as a cellular phone, that comprises an animation identification module for receiving an electronic message with one or more animation tags indicative of one or more animation sequences from a sender, such as a subscriber of a cellular network and analyzing them. During the analysis, the received animation tags are identified Optionally, the animation sequences are stored in the memory of the mobile communication terminal and/or accessed by it. The mobile communication terminal comprises a scene-animating module that manages and/or animates a virtual scene with one or more virtual objects according the animation sequences that have been indicated by the one or more animation tags in the received electronic message. The mobile communication terminal comprises an output module configured for rendering and/or outputting the animated virtual scene, optionally to a screen display thereof.

According to one embodiment of the present invention there is provided a method for animating one or more virtual objects in a virtual scene. First, a text message, such as an SMS, which includes a text string and one or more animation tags, indicative of one or more animation sequences, is received at a receiving side from a sender, via a wireless communication network. After the text message is received at the receiving side, one or more virtual objects in the virtual scene are animated according to the one or more animation sequences, which are associated with the animation tags. The receiving side renders and/or outputs the animated the virtual scene and the text string simultaneously, substantially simultaneously, or sequentially, to a display that presents them to a user, such as a subscriber of a cellular network, of the mobile communication terminal. Such an embodiment enhances the user experience of receiving and reading a text message, optionally without changing the readability of the aforementioned text string.

According to one aspect of the present invention there is provided a mobile communication terminal that comprises an animation identification module that us configured for receiving an electronic message with an animation tag indicative of an animation sequence and identifying the animation sequence according to the animation tag. The communication terminal further comprises a scene-animating module, electronically coupled to the animation identification module, configured for managing a virtual scene having at least one virtual object and animating the at least one virtual object according to the animation sequence.

Optionally, the mobile communication terminal further comprises an output module configured for outputting the animated virtual scene.

Optionally, the animation sequence comprising a set of instructions for animating the virtual object to portray graphically one or more behavioral motions.

Optionally, the mobile communication terminal further comprises a repository configured for storing of a plurality of tags associated with a plurality of animation sequences of the at least one virtual object, including the animation sequence.

More optionally, the plurality of animation sequences defines a user customized language.

More optionally, each the animation sequence is associated a member of the following group: a word, an emoticon, a sentence, and a phrase.

More optionally, the scene-animating module is configured for animating the at least one virtual object according a match between the animation tag and a tag of the plurality of tags.

Optionally, the mobile communication terminal is a cellular phone.

More optionally, the mobile communication terminal further comprising a caller identification module configured for identifying a caller identifier of a caller during a received call, the animation sequence being selected according to the caller identifier.

Optionally, the mobile communication terminal further comprises a repository configured for storing the virtual scene; the virtual scene is locally managed by the scene-animating module.

Optionally, the electronic message comprises textual content.

More optionally, the mobile communication terminal further comprises a screen display configured for displaying the animated virtual scene and the textual content substantially simultaneously.

Optionally, the electronic message comprises a virtual object tag, the scene-animating module being configured for selecting the at least one virtual object from a plurality of virtual objects according to the object tag.

Optionally, the animation tag is registered in an expression matching table mapping a plurality of animation sequences including the animation sequence, the expression matching table associates the animation tag with the animation sequence.

More optionally, the expression matching table is received in the electronic message.

More optionally, the plurality of animation sequences defines a member of the following group: the sign language, a user defined sign language, and a visual language.

More optionally, the mobile communication terminal further comprises a message preparation module configured for encoding an outgoing electronic message comprising at least one animation tag according to at least one predefined expression in a text string entered by a user.

Optionally, the animation tag is indicative of an audio track, and the scene-animating module is configured for playing the audio track during the animating.

According to one aspect of the present invention there is provided a method for animating a virtual scene. The method comprises managing a virtual scene comprising at least one virtual object, receiving a text message via a wireless communication network, identifying a pattern indicative of an animation sequence in the text message, and applying a non-facial animation on the at least one virtual object according the animation sequence.

Optionally, the pattern is a predefined animation tag indicative of the animation sequence.

More optionally, the method further comprises identifying a set of animation instructions according to the animation tag between b) and c), the non-facial animation being determined according to the set of animation instructions.

More optionally, the identifying comprises matching the animation tag with one of a plurality of tags associated with a plurality of sets of animation instructions.

More optionally, the method further comprises identifying a caller identifier of the sender of the text message before the applying, the animated virtual object being selected according to the caller identifier.

Optionally, the applying comprises rendering the animated virtual scene to a display of a mobile communication terminal.

Optionally, the method further comprises comprising encoding an animation tag according to the pattern and sending the text message with the animation tag via the wireless communication network before a).

Optionally, the animation tag is indicative of an audio track, and the applying comprising playing the audio track.

More optionally, the method further comprises allowing a user to select the at least one virtual object from a plurality of one virtual object.

According to one aspect of the present invention there is provided a system for transmitting and receiving an electronic message via a wireless communication network that comprises a sending communication terminal configured for encoding an animation tag of an animation sequence according to a predefined expression in a text string and wirelessly sending an electronic message comprising the animation tag. The electronic message is wirelessly received by a mobile communication terminal, the mobile communication terminal being configured for animating a virtual object in a virtual scene according to the animation sequence.

Optionally, the mobile communication terminal comprises a screen, the virtual scene and the text string being displayed simultaneously on the screen.

Optionally, the encoding and the animating are performed according to a common expression matching table, the common expression matching table mapping a plurality of predefined expressions to a plurality of animation tags including the animation tag, each the animation tag being associated with a respective animation sequence.

More optionally, the mobile communication terminal comprising a repository configured for storing the respective animation sequences.

More optionally, the system further comprises a central terminal connected to the wireless communication network and hosting the common expression matching table.

More optionally, each the communication terminal is configured for accessing the common expression matching table via the wireless communication network.

More optionally, each the communication terminal is configured for storing a copy of the common expression matching table, the copy being updated according to changes to the common expression matching table.

More optionally, the electronic message comprises the common expression matching table.

According to one aspect of the present invention there is provided a mobile phone that comprises a repository configured for storing of a plurality of animation sequences associated a plurality of callers, a caller identification module configured for identifying a caller, a caller-animating module configured for animating a virtual scene during the reception of the incoming call according to an animation sequence associated with the caller from the plurality of animation sequences, and a display configured for displaying the animated virtual scene.

According to one aspect of the present invention there is provided a mobile communication terminal that comprises a display configured for displaying a virtual scene having at least one virtual object, a user interface module configured for allowing a user to animate the at least one virtual object, the animation being indicative of an access code, and an access control module configured for using the access code for permitting access to a function of the mobile phone.

Optionally, the function comprises a member of the following group: an operational function of the mobile phone, a data access function of the mobile phone, and an establishment of a communication link between the mobile phone and a communication terminal.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE EMBODIMENTS

The principles and operation of an apparatus and method according to some embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Figure 1:
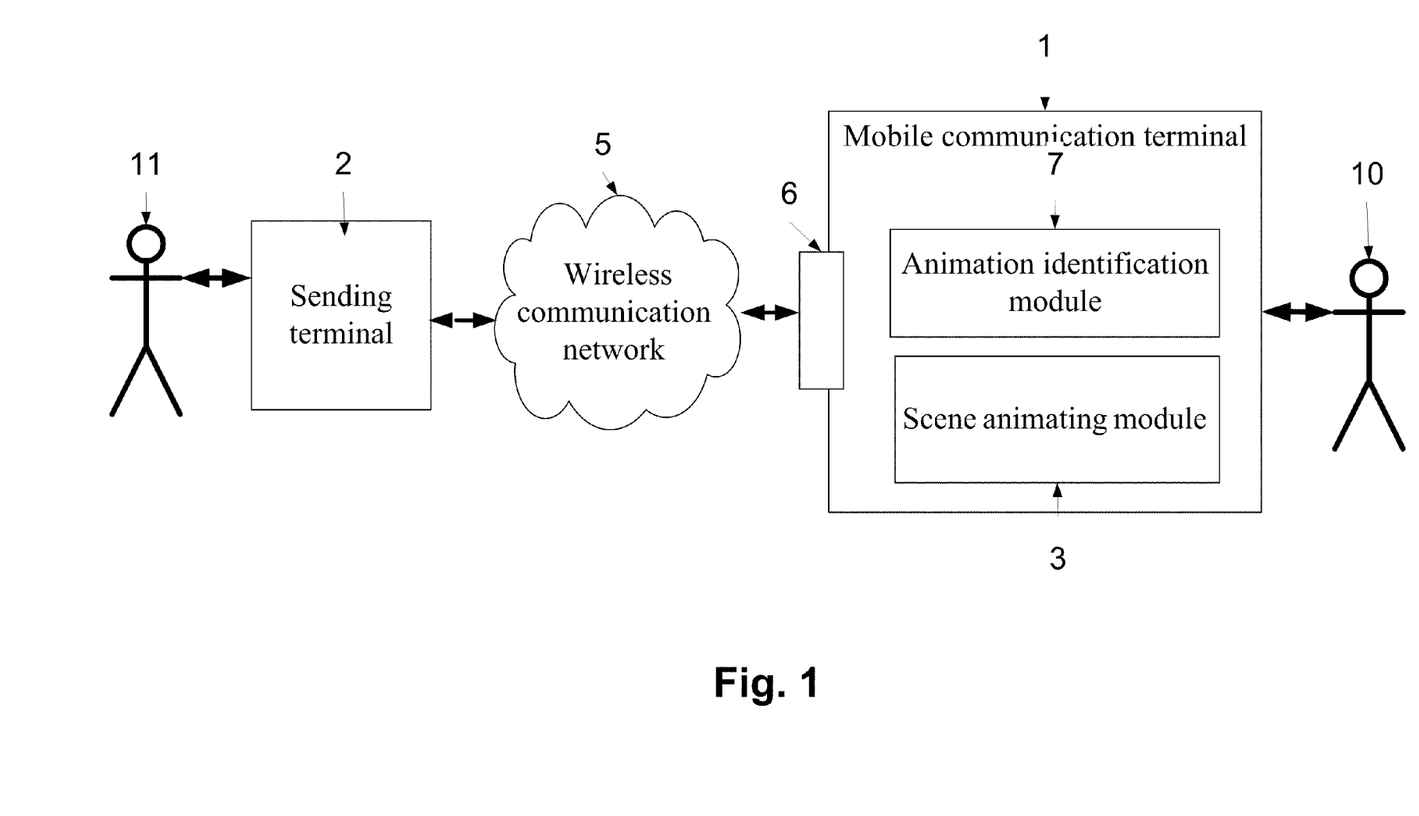
FIG. 1 is a schematic illustration of a mobile communication terminal for receiving an electronic message, a wireless communication network, and a sending terminal, according to an embodiment of the present invention.

Reference is now made to FIG. 1, which is a schematic illustration of a mobile communication terminal 1, such as a cellular phone, for receiving an electronic message, such as a text message, for example an SMS, a wireless communication network 5, and a sending terminal 2, such as an additional cellular phone, according to an embodiment of the present invention. The mobile communication terminal 1 comprises a receiving module 6 for receiving the electronic message via the wireless communication network 5, a message analysis module 7, optionally a repository (not shown), and a scene-animating module 3 that optionally comprises a graphical engine or the like and manages a virtual scene with one or more virtual objects.

The sending terminal 2 may be a mobile communication terminal, such as a cellular phone or a stationary terminal, such as a personal computer or a server. Optionally, the sending terminal 2 also comprises a repository, which is optionally similar to the repository of the mobile communication terminal 1, as described below.

According to one embodiment of the present invention, a remote user 11 uses the sending terminal 2 to prepare and send an electronic message with a text section, such as an SMS or a MIM, to the user 10 of the mobile communication terminal 1, via the wireless communication network 5. Optionally, predefined expressions from the text section, such as predefined words, idioms, emoticon, etc. are the basis for the creation of actions tags, which are optionally encoded and sent either with the text section or without it.

The mobile communication terminal 1 includes a controller that optionally comprises a microprocessor or microcontroller and a digital signal processor (DSP) device. Optionally, the controller is coupled over a bus to the repository.

Figure 2:
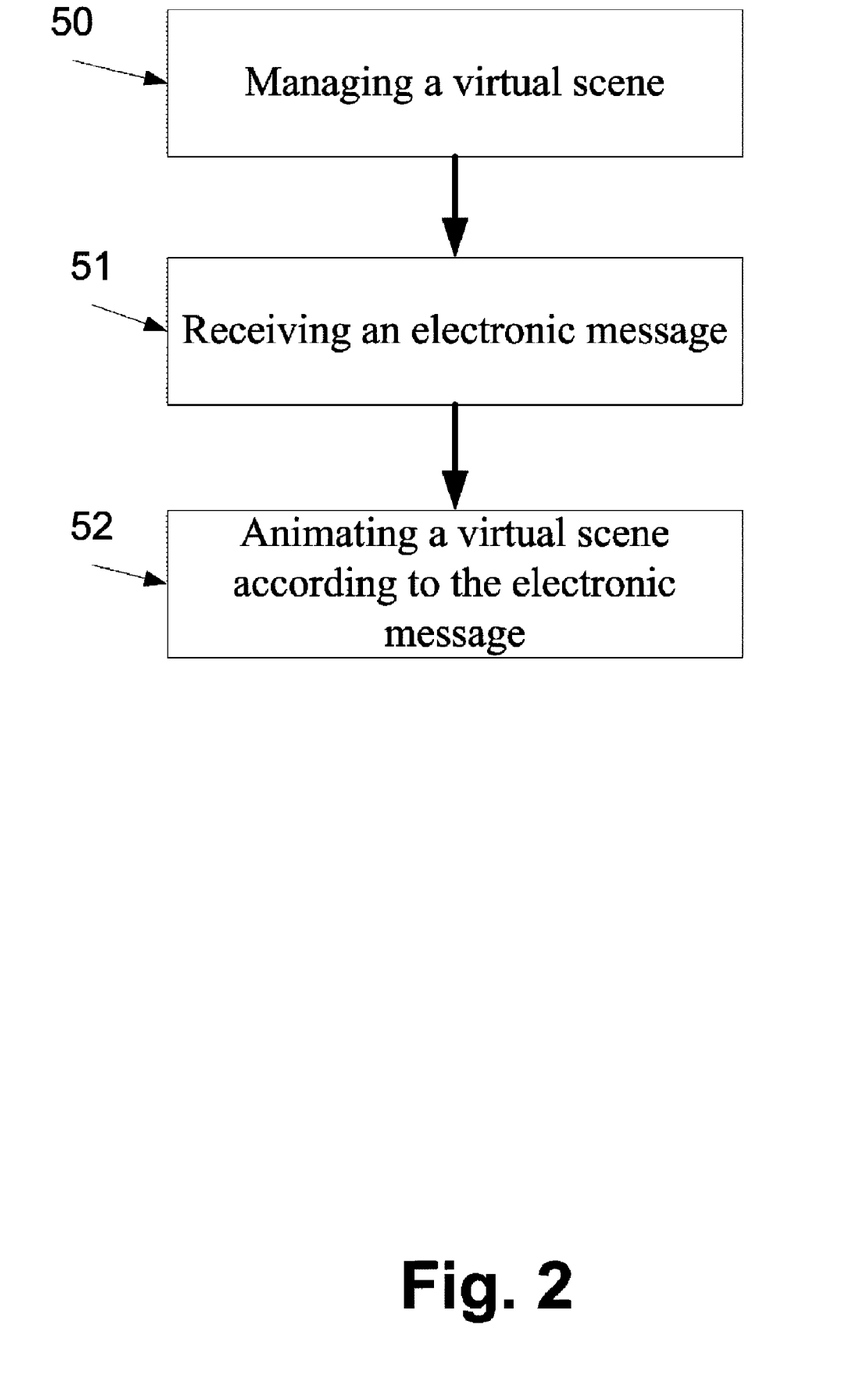
FIG. 2 is a flowchart of a method for receiving electronic message and animating a virtual scene accordingly, according to one embodiment of the present invention.

Reference is now made jointly to FIG. 1 and to FIG. 2, which is a flowchart of a method for receiving electronic message, such as an SMS, and animating a virtual scene accordingly, according to one embodiment of the present invention. Virtual scene is a collection of geometries and/or lights, along with the positional information that places these elements at particular locations. An example of a simple form of a virtual scene is a two dimensional (2D) image. A more complex form of a virtual scene which may be used is a three dimensional (3D) scene. As described below, the virtual scene includes one or more virtual objects such as virtual characters.

Then, as shown at 50, the scene-animating module 3 manages a virtual scene having one or more virtual objects such as virtual characters. The managing of the virtual scene includes the manipulation of the video objects which may be achieved with geometrical transform consisting of translation, scaling, and orientation-change, or by any known animating method. The scene-animating module 3 is designed to manipulate the video objects according to the animation sequences, as described below and optionally to store the last state of the virtual objects until additional animation sequences are received. Optionally, the writing of a data image or a sequence of data images that represents the virtual scene is managed by the scene-animating module 3. The image data is forwarded to a display memory and displayed on the monitor of the mobile communication terminal 1. The scene-animating module 3 manages the changing of the image data that is displayed on the screen. Optionally, the scene-animating module 3 comprises a display interface controller that repeatedly reads the image data from the display memory, optionally at regular short time intervals, and converts the read image data into red, green and blue video signals, which are then output to the screen.

Figure 5:
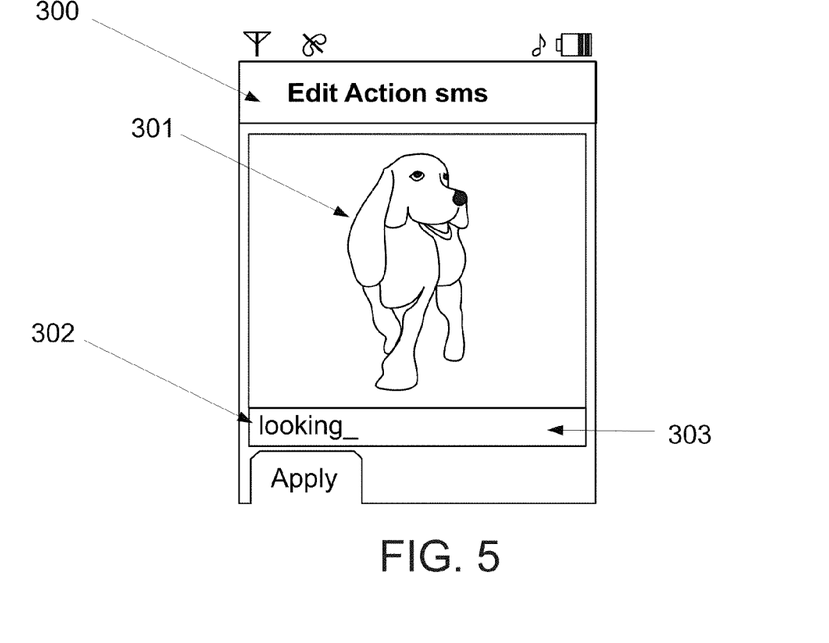
FIG. 5 is an exemplary screen display of a sending terminal, according to one embodiment of the present invention.

As further described below, the mobile communication terminal 1 hosts animation sequences of one or more virtual character. The animation sequences, which are animations defined in advance by a set of graphical instructions, may be used by the scene-animating module 3 to graphically portray one or more virtual objects in the virtual scene, which are designed to be displayed on the screen of the mobile communication terminal 1, for example as shown at FIG. 5. Optionally, an animation sequence may comprise one or more dubbing sequences and/or audio sequences. The animation sequences and the one or more virtual objects are optionally stored in the repository. Optionally, the animation sequences and the one or more virtual objects are downloaded from a central server, either in advance to the reception of the electronic message or as an outcome thereof.

As shown at 51, the mobile communication terminal 1 are designed to receive an electronic message with one or more animation tags, which may be referred to as patterns, indicative of one or more animation sequences. Optionally, each tag is a unique value, such as a number or an escape character (ESC).

Optionally, the mobile communication terminal 1 is a cellular phone and the network 5 is a cellular network. As commonly known, in the cellular communication field there is an advantage to processes that require relatively low bandwidth. As the virtual scene and the animation sequences thereof are stored locally in the memory of the mobile communication terminal 1, the process of sending and receiving electronic messages, as described below, requires relatively low bandwidth.

The electronic message may be received via a cellular connection established by a cellular transceiver and modem which are hosted in the mobile communication terminal 1, as further described below, or via another wireless connection that is established using another communication interface, such as a wireless local area network (WLAN) interface and/or a wireless personal area network (WPAN) interface. The WLAN interface is optionally a radio transceiver that uses high frequency radio signals, which are defined according to a WLAN standard, such as 802.11a, 802.11b, 802.11g, and 802.11n standards, which are herein incorporated by reference. The WLAN interface optionally uses high frequency radio signals. In such an embodiment, the wireless connection is optionally established according to WiMAX™ IEEE 802.16 standard or wireless FireWire IEEE 802.15.3 standard, which are incorporated herein by reference. The WPAN interface comprises a short-range radio interface, such as a Bluetooth™ transceiver, which is defined according to IEEE 802.15.1 specification that is incorporated herein by reference, optionally utilizing a Bluetooth™ enhanced data rate (EDR) chip that is defined according to a Bluetooth™ core specification version 2.0+EDR of the Bluetooth™ special interest group (SIG), which is incorporated herein by reference, or a Wibree® transceiver. Optionally, the WPAN interface comprises a radio transceiver that uses ultra-wideband (UWB) frequencies. In such an embodiment, the wireless interface may be established according to the WiMedia™ specification or according to the Wireless USB (WUSB) specification, which are incorporated herein by reference.

Then, after the electronic message has been received, one or more animation sequences are identified according to the animation tags, which are given in the electronic message. Optionally, the animation tags positioned in the header of the received electronic message and/or in any other manner that assures that they are not displayed to the user of the receiving communication device. Optionally, the animation tags positioned in the end of the body of the electronic message.

Optionally, each tag is associated with a certain animation sequence and may be referred to as animation tags. An animation sequence may be understood as a set of one or more generic instructions that define how a virtual object, such as a virtual character, or a group of virtual objects should be animated.

The received electronic message is forwarded to the message analysis module 7 that identifies which animation sequences are associated with the animation tags, which are inserted into the received electronic message, as further described below.

Optionally, the repository of the mobile communication terminal 1 stores a plurality of animation sequences of one or more virtual characters in a virtual scene. A virtual scene may be understood as a graphical representation of a virtual place where an action and/or an event occurs. A virtual character may be understood as a three dimensional (3D) or a two dimensional (2D) avatar, a virtual pet, as depicted in element 301 of FIG. 5, an animated inanimate object, and a virtual figure. It should be noted that a group of virtual characters may be referred to as a virtual character.

In one embodiment of the present invention, the one or more of the virtual characters are shared between one or more applications, such as a gaming application, a help interface, or a tamagotchi like applications, which are hosted on the mobile communication terminal 1. Optionally, the animation tags may be associated with animation sequences of virtual characters of gaming applications.

Each animation sequence is associated with an animation tag. Optionally, in use, the message analysis module 7 matches between the animation tags in the received electronic message and the animation tags which are associated with the animation sequences.

As shown at 52, after the message analysis module 7 identified the one or more animation sequences, as described above, the virtual scene is animated or re-animated. The identified animation sequences are forwarded to the scene-animating module that manages virtual scene and animates the virtual objects thereof according to the one or more identified animation sequences. Optionally, the virtual scene is animated according to the order of the animation tags in the electronic message. Optionally, each animation tag stores a timing sub-tag. In such an embodiment, the identified animation sequences are used to animate the virtual scene in an order that is determined according to their timing sub-tag.

Optionally, each animation sequence comprises a set of instructions that instructs the scene-animating module 3 to output an animation of a virtual character that graphically portrays a specific motion, a specific pose, a complex movement of a number of poses and/or motions, a complex dance, a clip, a simple gesture, or a user-defined choreography that represents emotions and/or objectives. Optionally, each animation sequence comprises a set of instructions that instructs the scene-animating module 3 to output a non-facial animation of a virtual character that graphically portrays one or more behavioral motions, such as sitting, eating, fighting, bathing, singing, hugging, and kissing and emotion expressions, such as happiness, sadness, anger, agony, passionate attraction, fondness, affection and love. Optionally, the set of instructions instructs the scene-animating module 3 to output facial animation of the ual character that graphically portrays one or more expressions such as smiling, crying, anger, agony, passionate attraction, fondness, affection and love.

Optionally, the set of instructions is designed to instruct the scene-animating module 3 to output an animation of a virtual character that graphically portrays a specific non-facial motion, a specific pose, a user-defined choreography, a complex dance, a clip, a simple gesture, or a complex movement of a number of poses and/or motions. Optionally, the scene-animating module 3 animates one or more virtual characters according to one or more sets of instructions, which are based on one or more electronic messages from one or more senders. Optionally, a number of electronic messages from the same sender are animated by a respective number of virtual characters simultaneously or substantially simultaneously. Optionally, a number of electronic messages from different senders are animated by a respective number of virtual characters simultaneously or substantially simultaneously.

Optionally, each animation sequence is attached or associated with an audio track, such as a moving picture experts group (MPEG)-1 audio layer 3 (MP3) file that is designed to be played during the presentation of the associated animation sequence. In such a manner, two different animation sequence that depicts a common motion or pose and different audio tracks may be defined in a new custom language, for example as the custom languages which are described below.

Optionally, each animation sequence comprises a set of instructions, such as a program code, subprogram, loop, or other code block that instructs the scene-animating module 3 to output an animation of a virtual character that graphically portrays a sign language gesture. For example, the set of instructions may be adapted to direct the processing device to manipulate the virtual characters in the virtual scene into a pose defined by a set of values of a set of animation variables.

In such an embodiment, a set of animation sequences that defines all or some of the sign language may be associated with related words or idioms. Each associated word or idiom may reflect the meaning of the related animation sequence that is associated therewith, an interpretation of the user to that meaning, or the like. Optionally, each animation sequence is associated with a unique animation tag.

As described above, the message analysis module is designed to identify animation sequences according to animation tags in the received electronic message, optionally using an expression matching table as described below. The identified animation sequences are forwarded to the scene-animating module 3 that animate one of more of a virtual scene accordingly. Optionally, the scene-animating module 3 comprises 2D and/or 3D graphics engines for animating the virtual scenes according to a set of instructions that is received from the repository. Optionally, the graphics engine is based on a scalable vector graphics (SVG) 1.1 and/or 1.2 specifications, which are incorporated herein by reference. The 2D or 3D graphics engine respectively utilizes 2D or 3D models, such as SVG mobile profiles, which are targeted to resource-limited devices and are part of the third generation partnership project (3GPP) platform for third generation mobile phones, which the specification thereof is incorporated herein by reference.

Optionally, the scene-animating module 3 selects one out of a number of alternative virtual characters to animate. Optionally, a set of animation sequences is defined for each one of the alternative virtual characters. Optionally, the scene-animating module 3 selects the virtual character according to a predefined rule, such as the identity of the sender of the electronic message, the reception time of the electronic message, the language of the electronic message, the length of the text in the electronic message, and the type of the electronic message.

In use, after the scene-animating module 3 animates the one or more virtual characters on the virtual scene, the animated virtual scene is outputted or rendered to a display unit, such as a screen display. Optionally, the mobile communication terminal 1 is a cellular phone and the animated virtual characters are rendered to the display thereof. In one embodiment of the present invention, the scene-animating module 3 calls a display driver, which performs the appropriate operations on an output buffer. The output buffer stores one or more images. Each one of the one or more images is represented as a bit map that is accessed directly by the display unit to display the one or more images on its screen.

Optionally, the mobile communication terminal 1 comprises a user interface (UI) that includes a UI device, such as a keypad, optionally a navigation device, such as a track-ball mouse, and a display device, such as a screen.

Figure 3:
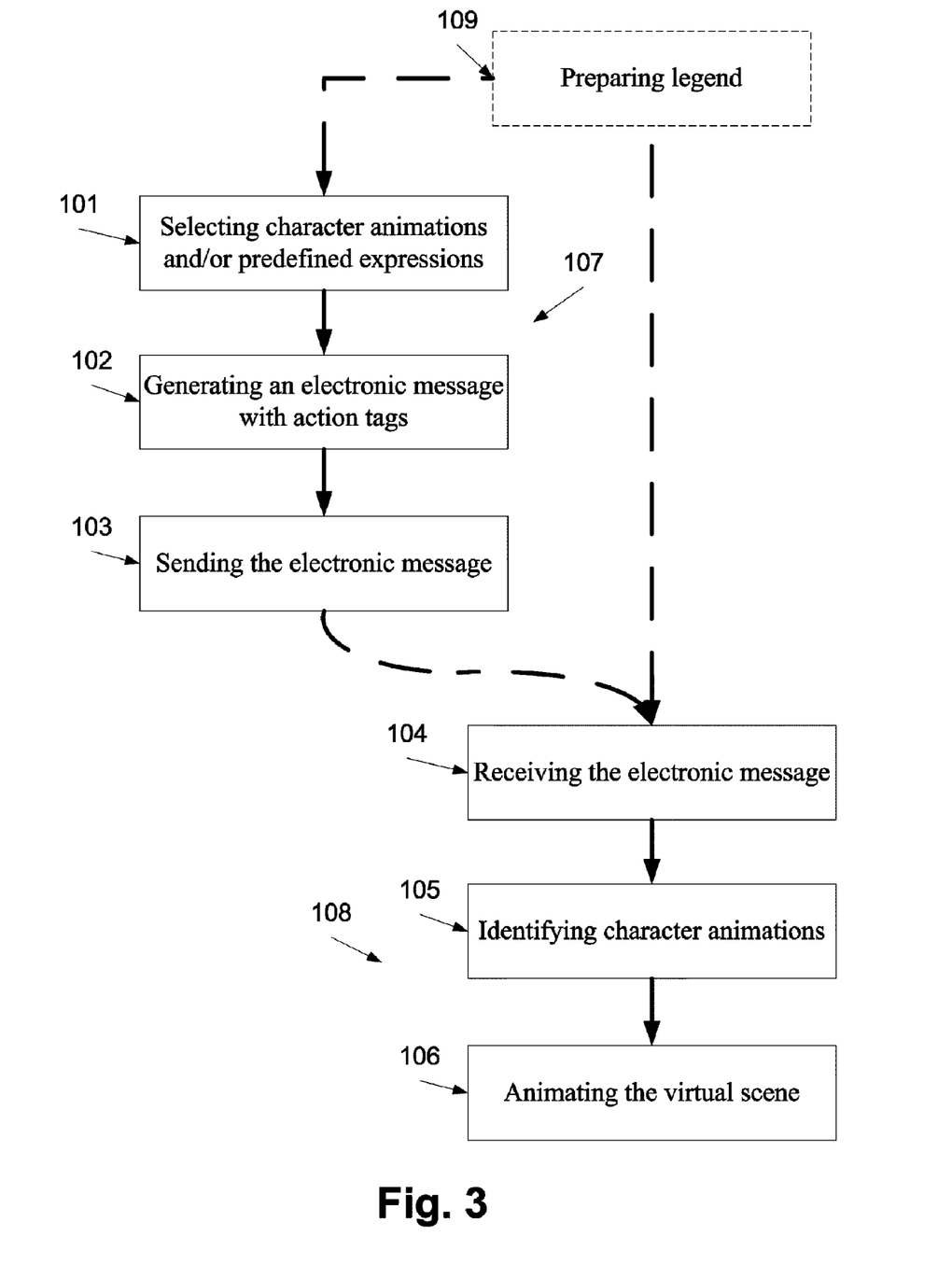
FIG. 3 is a flowchart of a method for preparing and sending an electronic message with animation tags and a method for receiving, animating, and optionally rendering the electronic message, according to embodiments of the present invention.

Reference is now made jointly to FIG. 1 and to FIG. 3, which is a flowchart of a method for preparing and sending an electronic message with animation tags, such as an SMS, as shown at 107, and a method for receiving, animating, and optionally rendering the electronic message, as shown at 108, according to embodiments of the present invention.

Figure 4:
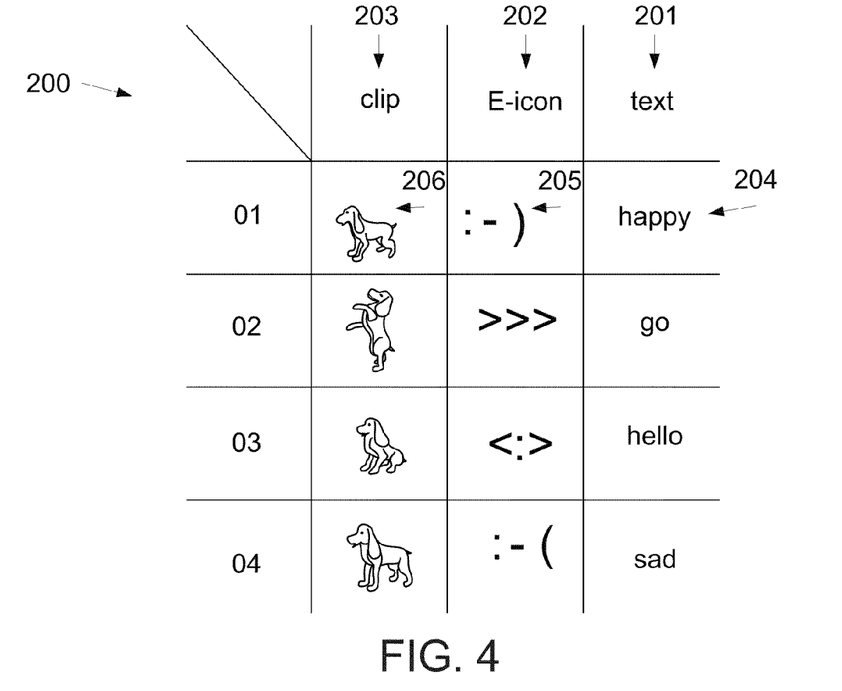
FIG. 4 is an exemplary expression matching table of predefined expressions, which are associated with animation tags of animation sequences, according to one embodiment of the present invention.

As shown at 109, the users 10, 11 of the sending and receiving terminals 1, 2 may prepare an expression matching table of predefined expressions that is common to the mobile communication terminal 1 and to the sending terminal 2, for example as depicted in FIG. 4. The preparation process of such an expression matching table is described below.

As shown at 107, the user 11 of the sending terminal 2 may prepare an electronic message with one or more animation tags and sends it, via a wireless communication network 5, to a remotely located mobile communication terminal 1. Optionally, as shown at 101 and further described below, the electronic message is based on a text string that comprises predefined expressions. It should be noted that the animation tags may be added to the electronic message either by the user 11 or by a module that creates them automatically according to a text string, as described below.

As described above, the mobile communication terminal 1 is designed for animating one or more virtual characters in a virtual scene according to one or more animation tags in the received electronic message. The animation instructions and graphics for such an animation are preferably stored in the repository of the mobile communication terminal 1. Optionally, each one of the animation sequences is associated with a unique animation tag. Optionally, the animation is based on animation tags, which are given in the electronic message, and indicative of animation sequences, as described below. These animation sequences are optionally identified using the aforementioned expression matching table.

Reference is now made jointly to FIG. 1 and FIG. 4, which is an exemplary expression matching table 200 of predefined expressions, such as words or idioms 201 and e-icons 202, which are associated with animation tags 203 of animation sequences, according to one embodiment of the present invention. The expression matching table defines the association between predefined expressions and animation sequences and/or the tag actions thereof. For example, as shown at row 01, the word 'happy' 204 and the e-icon :) 205 are associated with a certain animation tag of an animation sequence of a happily walking virtual character 206. Optionally, the symbol ☺, the sentence "I am happy", or both are also associated with the same animation sequence 206. As described above, each one of the animation sequences may be used for animating a virtual scene, such as a scene with 2D or 3D avatars, using related animation sequences, which are stored in the repository in advance, and are separate from the expression matching table. In such a manner, the user 10 may change or update the used animation sequences without updating the related expression matching table. Optionally, the expression matching table contains the animation tags of the animation sequences and not the animation sequences themselves.

Optionally, the repository stores a number of expression matching tables. Each expression matching table is associated with a group of one or more peers. Such an embodiment allows associating the same predefined expression with a number of animation sequences each intended to a different sender, a different timing, different user settings, a different battery power status, etc. Preferably, one or more of the groups are groups of social network peers, which are associated with the user 10, for example contacts of 'my friends' list in the MySpace™ webpage of the user 10 or the like. Optionally, the repository stores a contact-specific expression matching table to one or more members of the contact list of the mobile communication terminal 1. In such an embodiment, the user 10 may develop different custom languages, which are based on different animation sequences, with different groups of contacts. Optionally, the repository stores a default expression matching table that is used for animating electronic messages from unidentified peers or for encoding electronic messages thereto. It should be noted that the mobile communication terminal 1 may be used as a sending terminal 2 and optionally vise-versa.

Reference is now made to FIG. 4 and FIG. 5, which is an exemplary screen display 300 of the sending terminal 2 that is optionally a cellular phone, according to one embodiment of the present invention. The association between one of the predefined expressions and the animation tags that represent animation sequences 203 is performed using a graphical user interface (GUI) that is displayed on the screen of the mobile communication terminal that hosts the expression matching table 200, for example as shown at 300. The GUI allows the user to edit the expression matching table 300. For example, the GUI allows the user to enter, optionally using a text box 303, a predefined expression and to associated it with a chosen animation tag that represents a certain animation sequence 203. Optionally, the association between one of the predefined expressions and the animation tags that represent animation sequences 203 is performed on a server. The user accesses a website, which is connected to the server that allows the user to edit the expression matching table 300 and optionally to download it to the memory of the mobile communication terminal 1.

In such a manner, the user may create a new custom language that contains a set of animation sequences, each defined as a unit of the new custom language with meaning. The meaning of each one of the animation sequences is optionally the one or more associated predefined expressions. Such an embodiment further allows the user to prepare an electronic message that includes animation tags that allow her to express herself and the original text string she want to send. In such a manner, a user can add to the experience of sending a text message without losing the meaning thereof.

Optionally, one or more of the expression matching tables, which are stored and used by the mobile communication terminal, are correlated with a central expression matching table that is hosted on another terminal. As described above, the expression matching table may be used for defining a custom language between two or more users. In order to allow the two or more users to use the custom language, they have to use a common correlated expression matching table. Thus, in order to ensure that the used expression matching tables are correlated an updating mechanism that updates the correlated expression matching table of each one of the users is provided. Optionally, a correlating unit, such as a server that stores a central expression matching table is used for correlating the used expression matching tables. The correlating unit is preferably connected to the Internet and occasionally and/or periodically updates the used expression matching tables. Optionally, the updating is performed when the mobile communication terminal establishes a connection to the Internet.

Figure 6A:
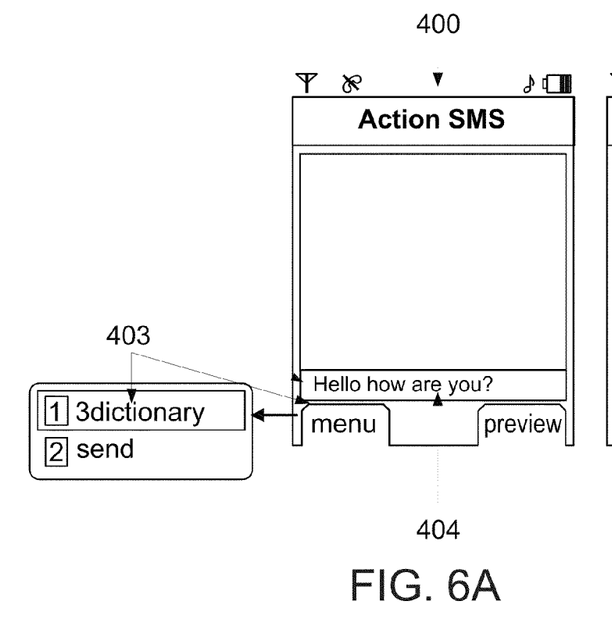
FIGS. 6A-6B are exemplary schematic screen displays of a sending terminal, according to one embodiment of the present invention.
Figure 6B:
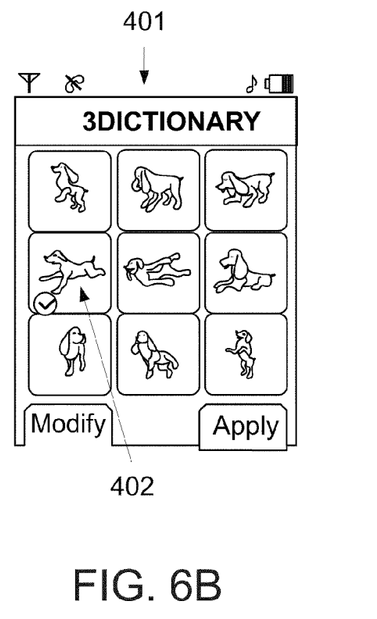

Reference is now made jointly, once again, to FIGS. 1 and 2, and to FIGS. 6A-6B, which are exemplary schematic screen displays of the sending terminal 2, which is preferably a cellular phone, according to one embodiment of the present invention. Optionally, the sending terminal 2 is designed for displaying a GUI 400 that allows the user 10 to prepare an electronic message with animation tags, which are optionally automatically selected according to one or more chosen animation sequences and/or predefined expressions.

Optionally, at shown at 107 and discussed above, the user 11 of the sending terminal 2 prepares an electronic message and sends it to the user 10 of the mobile communication terminal 1. As shown at 101, the user 11 may enter a text string that comprises predefined expressions, as shown at 404. Optionally, the user 11 may use a dictionary of animation sequences 401 that is optionally defined according to an expression matching table, that function as a dictionary, such as one of the aforementioned expression matching tables, for selecting animation sequences. Optionally, the user may choose whether to use the dictionary 401 or not, for example by choosing a certain tab in one of the menus of the sending mobile communication terminal, as shown at 403. Optionally, the GUI 400 displays a preview of the how the receiving end will see electronic message, optionally using avatars, which are locally stored in the repository of the mobile communication terminal 1, as described above. Optionally, the GUI 400 alerts the user when the size text string and the animation tags exceeds the size limit of the electronic message.

As shown at 102, each one of the entered predefined expressions and/or the selected animation sequences, for example as shown at 402, is encoded as a respective animation tag, according to the aforementioned expression matching table, and added to the electronic message. Optionally, an encoding module, which may be referred to as a language action engine (LAE) that is associated with the GUI 400, encodes the electronic message. The encoding module encodes the chosen animation sequences and/or the predefined expressions to respective actions tags according to the aforementioned expression matching table. Optionally, the expression matching table that is used for encoding depends on the addressee of the electronic message. As described above, different contacts may be associated with different expression matching tables and therefore the same selected animation sequences and/or predefined expressions may be encoded as a different set of animation tags. For example, if the user enters a text string that comprises the idiom 'how are you?', as shown at 404, and selects the animation sequence 'looking', as shown at 402, the encoding module may use an expression matching table, which is optionally associated with the addressee of the electronic message, for identifying matching actions tags, as described above. The matching actions tags are inserted into the electronic message that is sent to the addressee.

The encoding module is designed to encode the selected animation sequences and/or entered predefined expressions according to the type of the sent electronic message. Optionally, the electronic message is encoded as a regular cellular message, such as an SMS. In particular, the electronic message may be an SMS, an MIM, or any other type of electronic message that is supported by cellular network and comprises an analyzable message. As commonly known, the SMS—point-to-point (SMS-PP) and the SMS—Cell Broadcast (SMS-CB) protocols, which are defined respectively in the GSM 03.40 and GSM 03.41 recommendations, which are disclosed herein by reference, define the protocols for allowing electronic text messages to be transmitted to a mobile communication terminal in a specified geographical area. A transmission of SMSs may be done via different protocols, such as signaling system No. 7 (SS7) that is incorporated by herein by reference, within the standard GSM MAP framework or transmission control protocol internet protocol (TCP/IP) within the same standard. Messages are sent with the additional MAP operation forward_short_message that is limited by the constraints of the signaling protocol to precisely 140 bytes. Characters in languages such as Arabic, Chinese, Korean, Japanese or Slavic languages are encoded using the 16-bit UCS-2 character encoding. Each electronic message includes a text that comprises a number of characters, such as letters, numbers, symbols, and emoticons.

Optionally, the encoding module encodes the animation sequence and/or predefined expressions according to a protocol of an electronic message that is readable to the target mobile communication terminal 1. Optionally, the encoding module is designed to identify the capabilities of the target mobile communication terminal. For example, when the sent electronic message relevant is an SMS, device capabilities and user-agent information are encoded in the header thereof. Optionally, if the receiving side is not designed to decode and display actions tags, the decoding element of the receiving side parses the binary representation of the SMS and extracts the required data, allowing the readable text to be displayed as a simple SMS that includes text without changing the header. Optionally, a text that indicates to user that her mobile communication terminal does not support actions tags is attached to the electronic message and display only of the receiving mobile communication terminal does not support actions tags.

Then, as shown at 103, the electronic message with the animation tags is sent to the target mobile communication terminal 1. As the electronic message comprises only the animation tags and not the animation sequences or the graphic elements of the virtual character, the bandwidth and computational complexity, which are needed for sending it, are relatively low.

Optionally, the expression matching table that has been used for preparing the electronic message is sent to the target mobile communication terminal 1, either with the electronic message or in advance, for example with an updating message, a previous message, a download from a designated server, or an updating of the target mobile communication terminal 1. Optionally, the electronic message is sent with a reference, such as a hyperlink to a hosting terminal that stores a copy of the expression matching table. Such a reference allows the receiving end to access the hosting terminal and to download the related expression matching table. Optionally, the sent expression matching table is distributed to multiple recipients.

Optionally, the sent expression matching table is a user-specific expression matching table or a group specific expression matching table. Such an expression matching table may define a language that is unique to the communication between the user 10 and one or more specific users. In such a manner, two of more users may share a common new custom language. As the payload of the transmission of the expression matching table may be high, an MMS or another messaging application of sufficient capacity may be used.

The sent message is received at the mobile communication terminal 1, as shown at 104. As shown at 105, the message analysis module 7 identifies animation sequences, which are associated with the animation tags in the received electronic message.

Optionally, the message analysis module 7 of the mobile communication terminal 1 matches between the animation tags in the received message and the unique animation tags, which are associated with the animation sequences that are stored in the repository, and identifies one or more matching animation sequences.

Then, as shown at 106, one or more virtual characters of the virtual scene are animated according to the matching animation sequences. The virtual characters are either defined by the user or chosen according to the identity of the sender, as described below. The animated virtual characters are outputted or rendered to the display unit of the mobile communication terminal 1, as discussed above.

Figure 7:
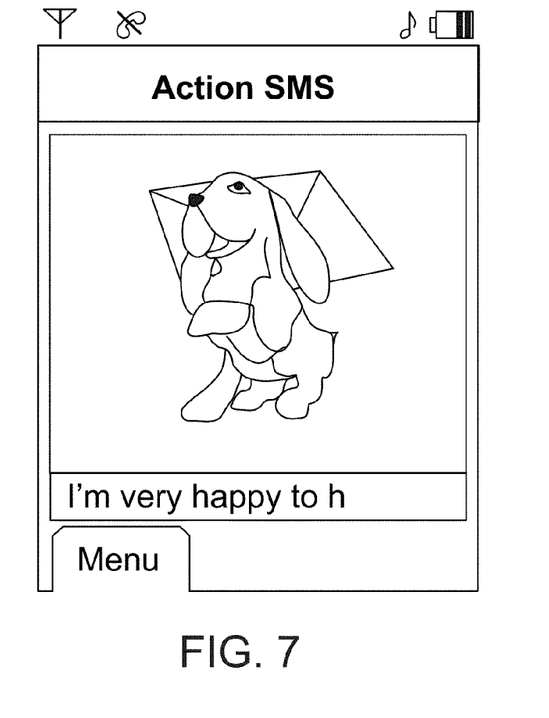
FIG. 7 is an additional exemplary schematic screen display of a sending terminal, according to one embodiment of the present invention.

Optionally, the mobile communication terminal 1 allows the user 10 to configure the presentation of the received electronic message on its display. For example, the user 10 may configure the mobile communication terminal 1 to present the matching animation sequences as a 3D animated clip or as a clip of the matching animation sequences that combines the text that has been provided in the electronic message, as shown at FIG. 7. Optionally, the user 10 may configure the mobile communication terminal 1 to present only the plain text message. Optionally, the user 10 may configure the mobile communication terminal 1 to present an expression matching table or a table that outlines the matched animation sequences with corresponding explanations. Optionally, the corresponding explanations are based on the expression matching table that has been used for generating the received electronic message. In such an embodiment, the related expression matching table may be sent either with the electronic message and/or in advance, as described above. It should be noted that the presentation of the animated virtual scene may be synchronized with the presentation of the text.

Figure 8:
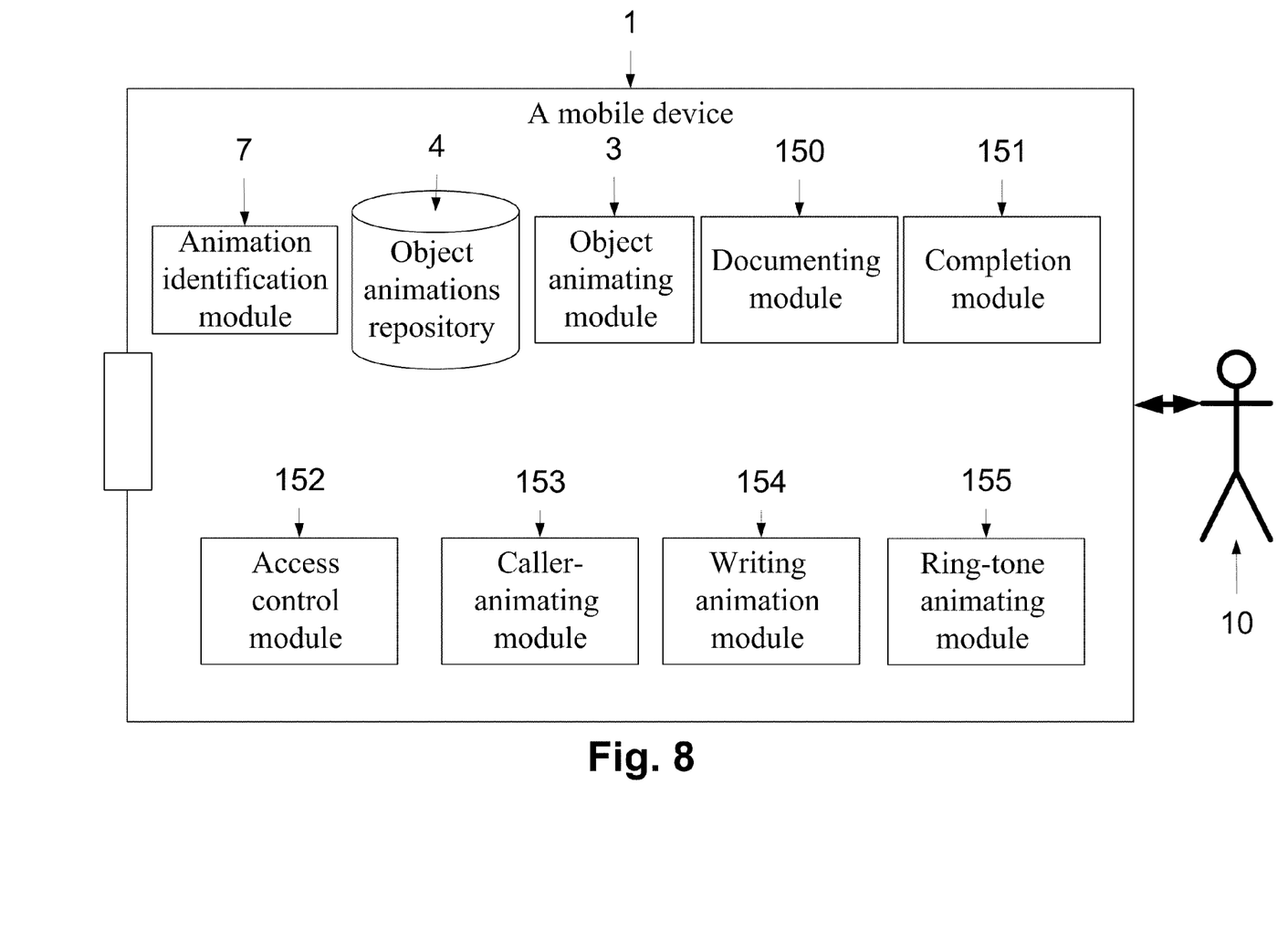
FIG. 8 is a schematic illustration of the mobile communication terminal that is depicted in FIG. 1 with additional modules and capabilities, according to other embodiments of the present invention.

Reference is now made to FIG. 8, which is a schematic illustration of the mobile communication terminal 1 of FIG. 1 with a repository 4 and additional modules and capabilities, according to other embodiments of the present invention.

Optionally, the mobile communication terminal 1 comprises a documenting module 150 that manages and optionally stores all the correspondence between the user 10 and different peers. Optionally, the documenting module 150 allows the user to view all the animated electronic messages, the received texts, and the expression matching tables that have been used for encoding the animated electronic messages.

Optionally, the mobile communication terminal 1 comprises a completion module 151 that automatically suggests the user how to complete a text string that is entered by her, according to predefined expressions, which are stored in the aforementioned expression matching tables. In such a manner, the user 11 is hinted which words, idioms, or e-icons are in the expression matching table and therefore may compose the electronic message more easily.

Optionally, the completion module 151 automatically suggests an animation to add, optionally according to the aforementioned analysis of the text string.

Optionally, the mobile communication terminal 1 comprises an access control module 152. As described above, the configuration module of the mobile communication terminal 1 allows the user of the sending terminal 2 to associate basic elements of a certain language, such as letters, words, or sentences with animation sequences, thereby defining a new custom language. As described above, only the user and optionally selected peers know the new custom language. This characteristic allows the user to encode a password or the like using the units of the new custom language, which are animation sequences. In use, the access control module 152 is activated when the user 10 tries to access restricted areas of the mobile communication terminal or try to use a service that requires identification or password. The access control module 152 presents a GUI that allows the user to select an animation sequence or a combination of a number of animation sequences.

Optionally, the GUI presents a dictionary of possible animation sequences. Optionally, the dictionary allows the user to select a virtual character to perform one or more chosen animation sequences. Such a selection may be used for simulating the execution of the code.

Optionally, the mobile communication terminal 1 comprises a caller-animating module 153 for presenting a caller depended animation when receiving calls or massages. As described above, each one of the virtual character may have a number of animation sequences, and/or each animation sequence may be associated with a different animation tag. As commonly known, mobile communication terminals 1, such as cellular phones modules, uses modules, such as automatic number identification (ANI) modules, for analyzing the incoming calls or messages, thereby identifying the network user ID or the number of the sender.

Optionally, the caller-animating module 153 associates or allows the user to associate one or more animation sequences and/or related animation tags with each one of the contacts which are present on the users contact list. In such a manner, the caller-animating module 153 may be able to present a different animation for different callers, according to the animation sequences or related animation tags, which are associated with a related record in the contact list of the mobile communication terminal 1. For example, the user may define a virtual character of a dog that jiggles a different dance according to a match between the user ID of a caller and the animation sequences or related animation tags stored in a related record. Optionally, the virtual character is graphically portrayed according to a default or random set of animation sequences whenever an incoming call from a contact, which is not associated with the animation sequences or the related animation tags, is received, for example whenever an unidentified incoming call is received.

Optionally, the mobile communication terminal 1 comprises a writing animation module 154 for generating a text message that comprises one or more animation tags according to a text string that is submitted by users. The writing animation module 153 animates the submitted text string by matching predefined expressions in the text string with records of a certain expression matching table that is optionally defined as depicted in FIG. 4. Such a module may be used for implementing entertainment games wherein the writing animation module 153 animates text strings. For example, the user may use the writing animation module 154 for generating an electronic message with a plurality of animation tags that set a sequence of animations and sending it to a central server that hosts a contest game wherein peers rank the sent animation.

Optionally, the writing animation module 154 is used as a writing tool that is activated whenever the user enters text, for example when she writes an SMS, an MIM, or any other messaging application.

Optionally, the mobile communication terminal 1 comprises a ring-tone animating module 155 for animating ring-tones. As described above, each one of the virtual character has a number of animation sequences, each animation sequence is associated with a different animation tag. Optionally, the ring-tone animating module 153 allows a user to associate between ringtones, sounds of ringtones, or any other sound, which is generated by the mobile communication terminal 1. Optionally, the ring-tone animating module 153 associates and/or allows the user associate different animation tags with different notes or chords. In such an embodiment, the ring-tone animating module 153 renders an animation of a virtual character on the screen of the mobile communication terminal 1 whenever a ringtone is played. Optionally, the animation is defined according to the animation tags, which are associated with the notes or chords of the played ringtone. Optionally, the animation is defined according to a set of animation tags, which are associated with the played ringtone.

It is expected that during the life of this patent many relevant devices and systems will be developed and the scope of the terms herein, particularly of the terms a mobile communication terminal, a sending terminal, an electronic message, and a cellular phone is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A mobile communication terminal having a processor, comprising:
   a repository which stores at least one virtual object;
   an animation identification module configured for receiving an electronic text message comprising an animation tag indicative of an animation sequence and using the processer for identifying said animation sequence according to said animation tag; and
   a scene-animating module, electronically coupled to said animation identification module, configured for locally managing using the processor a virtual scene having said at least one virtual object and applying non-facial animation to said at least one virtual object in said locally managed virtual scene according to said animation sequence.

2. The mobile communication terminal of claim 1, wherein said applying comprises applying facial animation.

3. The mobile communication terminal of claim 1, further comprising an output module configured for outputting said animated virtual scene.

4. The mobile communication terminal of claim 1, wherein said animation sequence comprising a set of instructions for animating said virtual object to graphically portray one or more behavioral motions.

5. The mobile communication terminal of claim 4, wherein behavioral motions comprise one of: sitting, eating, fighting, bathing, singing, hugging, kissing, happiness, sadness, anger, agony, passionate attraction, fondness, and love.

6. The mobile communication terminal of claim 1, wherein the repository configured for storing of a plurality of tags associated with a plurality of animation sequences of said at least one virtual object, including said animation sequence.

7. The mobile communication terminal of claim 6, wherein said plurality of animation sequences defines a user customized language.

8. The mobile communication terminal of claim 6, wherein each said animation sequence is associated a member of the following group: a word, an emoticon, a sentence, and a phrase.

9. The mobile communication terminal of claim 6, wherein said scene-animating module is configured for animating said at least one virtual object according a match between said animation tag and a tag of said plurality of tags.

10. The mobile communication terminal of claim 1, wherein the mobile communication terminal is a cellular phone.

11. The mobile communication terminal of claim 10, further comprising a caller identification module configured for identifying a caller identifier of a caller during a received call, said animation sequence being selected according to said caller identifier.

12. The mobile communication terminal of claim 1, wherein the repository configured for storing said virtual scene; said virtual scene is locally managed by said scene-animating module.

13. The mobile communication terminal of claim 1, wherein said electronic text message comprises textual content.

14. The mobile communication terminal of claim 13, further comprising a screen display configured for displaying said animated virtual scene and said textual content substantially simultaneously.

15. The mobile communication terminal of claim 1, wherein said electronic text message comprises a virtual object tag, said scene-animating module being configured for selecting said at least one virtual object from a plurality of virtual objects according to said virtual object tag.

16. The mobile communication terminal of claim 1, wherein said animation tag is registered in an expression matching table mapping a plurality of animation sequences including said animation sequence, said expression matching table associates said animation tag with said animation sequence.

17. The mobile communication terminal of claim 16, wherein said expression matching table is received in said electronic text message.

18. The mobile communication terminal of claim 16, wherein said plurality of animation sequences defines a member of the following group: the sign language, a user defined sign language, and a visual language.

19. The mobile communication terminal of claim 1, further comprising a message preparation module configured for encoding an outgoing electronic text message comprising at least one animation tag according to at least one predefined expression in a text string entered by a user.

20. The mobile communication terminal of claim 1, wherein said animation tag is indicative of an audio track, and said scene-animating module is configured for playing said audio track during said applying.

21. The mobile communication terminal of claim 1, wherein applying non-facial animation comprising one of: specific pose, user-defined choreography, complex dance, clip, simple gesture, and complex movement of a number of poses or motions.

* * * * *